(12) United States Patent
Maier

(10) Patent No.: US 10,424,979 B2
(45) Date of Patent: Sep. 24, 2019

(54) STATOR FOR AN ELECTRIC MOTOR HAVING RESPECTIVE ANGLED SLOTS

(71) Applicant: Bayerische Motoren Werke Aktiengesellschaft, Munich (DE)

(72) Inventor: Alexander Maier, Glonn (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 3 days.

(21) Appl. No.: 15/728,795

(22) Filed: Oct. 10, 2017

(65) Prior Publication Data

US 2018/0034328 A1  Feb. 1, 2018

Related U.S. Application Data

(63) Continuation of application No. PCT/EP2016/063271, filed on Jun. 10, 2016.

(30) Foreign Application Priority Data

Jul. 27, 2015  (DE) .................. 10 2015 214 106

(51) Int. Cl.
*H02K 1/12* (2006.01)
*H02K 1/16* (2006.01)
(Continued)

(52) U.S. Cl.
CPC ............ *H02K 1/12* (2013.01); *H02K 1/16* (2013.01); *H02K 3/04* (2013.01); *H02K 1/148* (2013.01);
(Continued)

(58) Field of Classification Search
CPC .......... H02K 1/12; H02K 1/148; H02K 1/165; H02K 3/04; H02K 3/32; H02K 3/34; H02K 3/345; H02K 2201/06
(Continued)

(56) References Cited

U.S. PATENT DOCUMENTS 7,397,159 B2 * 7/2008 Yoshinaga ............ H02K 21/14
310/112
7,525,229 B1 * 4/2009 Willig .................. H02K 1/2733
310/156.03
(Continued)

FOREIGN PATENT DOCUMENTS

CN 1808861 A 7/2006
CN 1925261 A 3/2007
(Continued)

OTHER PUBLICATIONS

International Search Report (PCT/ISA/210) issued in PCT Application No. PCT/EP2016/063271 dated Sep. 20, 2016 with English translation (Four (4) pages).
(Continued)

*Primary Examiner* — Julio C. Gonzalez
*Assistant Examiner* — Rashad H Johnson
(74) *Attorney, Agent, or Firm* — Crowell & Moring LLP

(57) ABSTRACT

A stator is provided for an electric machine. The stator includes a plurality of teeth which are each designed such that a winding can be arranged on them. The teeth are at a first angle in relation to the longitudinal axis in a first region which extends in the axial direction of the stator. The teeth are at a second angle, which differs from the first angle, in relation to the longitudinal axis in a second region which extends in the axial direction of the stator. A third region in which the teeth are electrically insulated is arranged between the first region and the second region.

14 Claims, 5 Drawing Sheets

(51) Int. Cl.
*H02K 3/04* (2006.01)
*H02K 3/34* (2006.01)
*H02K 1/14* (2006.01)
*H02K 3/32* (2006.01)

(52) U.S. Cl.
CPC .............. *H02K 1/165* (2013.01); *H02K 3/32* (2013.01); *H02K 3/325* (2013.01); *H02K 3/34* (2013.01); *H02K 3/345* (2013.01); *H02K 2201/06* (2013.01)

(58) Field of Classification Search
USPC ............ 310/179, 216.015, 216.016, 216.017
See application file for complete search history.

(56) References Cited

U.S. PATENT DOCUMENTS

| | | | |
|---|---|---|---|
| 7,541,710 B2 | 6/2009 | Nemoto et al. | |
| 9,941,764 B2* | 4/2018 | Huber | H02K 3/522 |
| 2004/0195926 A1 | 10/2004 | Hiwaki et al. | |
| 2005/0179334 A1 | 8/2005 | Yoshinaga | |
| 2006/0267443 A1* | 11/2006 | Fukasaku | H02K 1/16 310/216.069 |
| 2007/0001525 A1* | 1/2007 | Schneider | H02K 3/345 310/71 |
| 2009/0026872 A1 | 1/2009 | Tomohara et al. | |
| 2009/0066183 A1* | 3/2009 | Aramaki | H02K 1/148 310/216.008 |
| 2010/0283348 A1* | 11/2010 | Okubo | H02K 1/278 310/156.47 |
| 2011/0133580 A1* | 6/2011 | Sugimoto | H02K 1/20 310/54 |
| 2012/0007465 A1* | 1/2012 | Fargo | H02K 1/165 310/216.069 |
| 2012/0025653 A1* | 2/2012 | Maynez | H02K 23/04 310/154.28 |
| 2013/0043743 A1* | 2/2013 | Kim | H02K 3/34 310/43 |
| 2018/0034331 A1* | 2/2018 | Csoti | H02K 3/28 |

FOREIGN PATENT DOCUMENTS

| | | |
|---|---|---|
| CN | 102365806 A | 2/2012 |
| CN | 102957229 A | 3/2013 |
| CN | 102983696 A | 3/2013 |
| DE | 44 11 751 C2 | 7/1997 |
| DE | 10 2010 026 263 A1 | 1/2012 |
| WO | WO 2010/110797 A1 | 9/2010 |
| WO | WO 2011/114574 A1 | 9/2011 |

OTHER PUBLICATIONS

German-language Written Opinion (PCT/ISA/237) issued in PCT Application No. PCT/EP2016/063271 dated Sep. 20, 2016 (Five (5) pages).

German-language Office Action issued in counterpart German Application No. 10 2015 214 106.3 dated Jul. 25, 2016 (Three (3) pages).

Chinese Office Action issued in Chinese counterpart application No. 201680026425.7 dated Dec. 29, 2018, with English translation (Seventeen (17) pages).

* cited by examiner

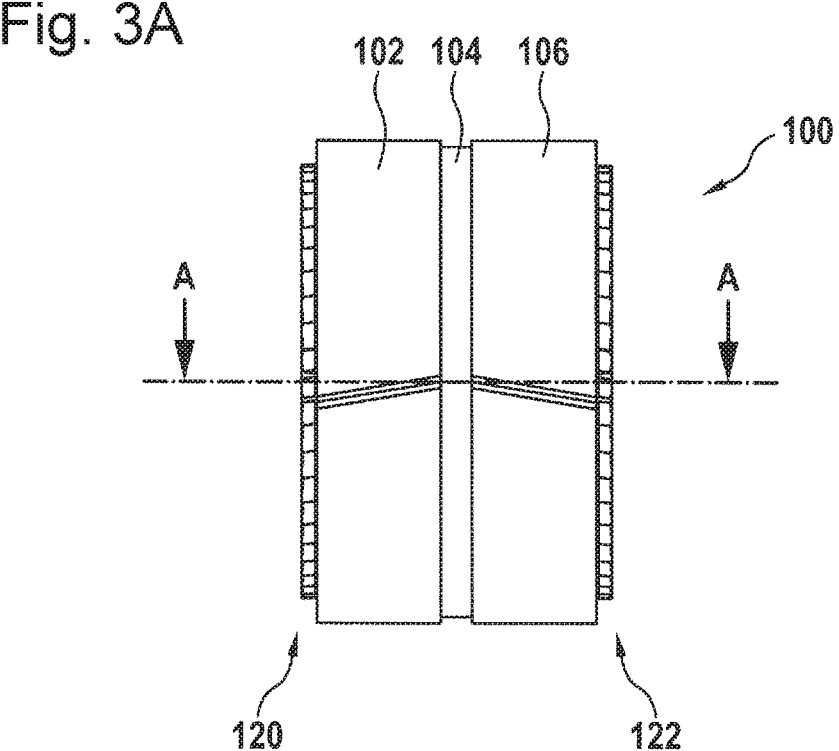

STATOR FOR AN ELECTRIC MOTOR HAVING RESPECTIVE ANGLED SLOTS

CROSS REFERENCE TO RELATED APPLICATIONS

This application is a continuation of PCT International Application No. PCT/EP2016/063271, filed Jun. 10, 2016, which claims priority under 35 U.S.C. § 119 from German Patent Application No. 10 2015 214 106.3, filed Jul. 27, 2015, the entire disclosures of which are herein expressly incorporated by reference.

BACKGROUND AND SUMMARY OF THE INVENTION

The present invention relates to a stator for an electric machine with improved technical vibration and acoustic properties.

Electric machines are used, inter alia, in electrically driven vehicles to drive said vehicles. An electric machine typically comprises a stator on which a plurality of windings which generate a rotational field are arranged. In an internal rotor, a rotor is arranged on a shaft in the stator. The rotor can have permanent magnets or electromagnets. The stator is usually formed by a plurality of pieces of sheet metal arranged one on top of the other, referred to as laminated cores. The invention accordingly also applies to electric machines with an external rotor.

The windings are typically arranged on teeth. Teeth are regions which, in the case of internal rotors, extend inwardly in the radial direction from the essentially cylindrical rotor. When the rotor rotates, an irregularity in the torque is induced by the profile of the inductance which generally fluctuates. This fluctuation in the torque gives rise, inter alia, to acoustic excitations which can be expressed in the form of sound emissions.

In order to reduce the sound emissions, it is known to arrange the teeth obliquely with respect to the axial direction of the stator. Such a stator is described, for example, in DE 10 2010 026 263 A1.

Such a linear oblique arrangement in the electric machine in merely one direction gives rise to an irregular generation of torque in the rotor, in the axial direction of the rotor, said irregular generation giving rise to torsional vibrations, inter alia within the rotor, and as a result to further emissions of sound.

It is proposed to embody the teeth with a double oblique arrangement, for example an arrow-shaped oblique arrangement. However, this results in insulation problems when the oblique angle changes. In particular, the insulation of the groove between the teeth and the use of a sliding cover are critical, since the materials used here are bent and consequently their insulation properties are lost or at least reduced.

The invention is based on the object of providing an electric machine with reduced emissions of sound or excitation of vibrations.

The object of the invention is achieved by a stator, as well as an electric machine having the stator, wherein the stator according to the invention comprises a plurality of teeth which are configured such that a winding can be arranged thereon. The teeth or the grooves between the teeth have a first angle with respect to the longitudinal axis in a first region extending in the axial direction. The teeth or the grooves between the teeth have a second angle with respect to the longitudinal axis in a second region extending in the axial direction of the stator, said second angle being different from the first angle or being opposite to the first angle. The stator has a third region in which the teeth are electrically insulated or are composed of insulation material and which is arranged between the first region and the second region. The third region is arranged in the axial direction between the first and second regions.

In the third region, the teeth have an angle which differs from the first and second angles. Electrical insulation is necessary only in the first and second regions. The insulation of the windings with respect to the stator can therefore be embodied in two stages.

In one embodiment, the insulation can be designed in a single piece. In this case, the insulation in the third region can be implemented by means of selective weakening, for example by use of indents or impressions, in such a way that the insulation material can follow the change in the oblique angle. Consequently, the insulation of the windings of the stator in the region in which the oblique arrangement of the teeth changes from the first angle to the second angle cannot tear. Accordingly, the excitations of vibrations and, therefore, the emission of sound is reduced by the double complementary oblique arrangement. In addition, more uniform torque output is achieved.

The teeth or the groove between them preferably extend in the axial direction in the third region. The teeth and the groove between the teeth can change their angle in the third region so that a transition from the first angle to the second angle is produced.

The first and second regions can be formed at least 50%, more preferably 75%, and most preferably 95%, from a ferromagnetic material. Typically, the first region and the second region each have a laminated core. A laminated core comprises a plurality of sheet metal pieces which are stacked one on the other in the axial direction and are electrically insulated from one another.

In the third region, the teeth can be arranged parallel to the longitudinal axis of the stator. The first region can be formed by a first stator element, the second region can be formed by a second stator element, and the third region can be formed by a third stator element which is arranged between the first stator element and the second stator element and is formed from a material which is electrically nonconductive. In this configuration, the third region is formed by a separate solid stator element.

The third region can include a plurality of elements whose angle can be adjusted with respect to the longitudinal axis. As a result, the stator can be manufactured more easily since abrupt junctions are avoided. The elements can be manufactured from an electrically insulating material.

In another refinement, the first region is formed by a first stator element, the second region is formed by a second stator element and the third region is formed by an insulation layer which is arranged radially inward and partially in the direction of the axial end of the stator on a part of the first region and of the second region. In this refinement, the third region can be formed by a comparatively thin insulation layer, for example a film. In order to avoid air paths and creepage paths the film can be several mm thick.

An electric machine according to the invention comprises the stator described above, windings which are arranged on the teeth of the stator, and at least a first insulation element and at least a second insulation element in the case of a two-part insulation. The at least one first insulation element is arranged on the first region, and the at least one second insulation element is arranged on the second region. The winding is arranged on the first insulation element and the second insulation element.

As has been mentioned above, the insulation elements are embodied in two parts. As a result, bending and/or tearing of an insulation element at the junction between the first angle and the second angle of the toothed stator can be avoided. It is possible to provide an insulation element which covers all the teeth of the first region or of the second region. However, it is also possible to provide a separate insulation element in each groove between two teeth of the stator.

The at least one first insulation element can be arranged on the first region and on a part of the third region, and the at least one second insulation element can be arranged on the second region and on a part of the third region.

A single-piece insulation element can be arranged on the first region, the third region and the second region, and can have at least one flexible region on the third region and/or in the surroundings of the third region.

The invention also relates to a vehicle having the electric machine described above.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 3A to 3D show teeth and grooves as well as insulation elements of the stator.

DETAILED DESCRIPTION OF THE DRAWINGS

Figure 1:
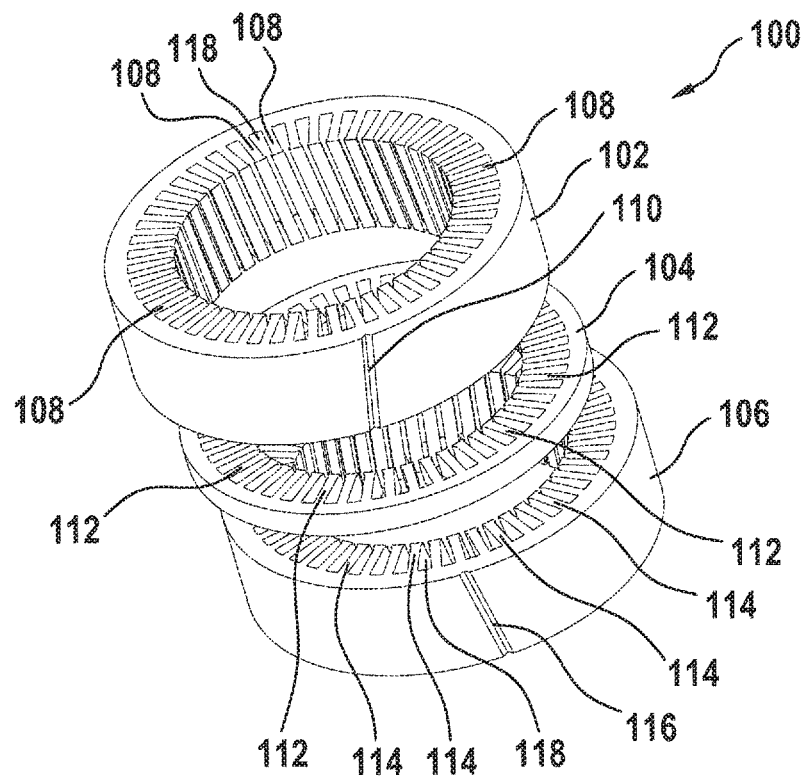
FIG. 1 is an exploded drawing of the stator according to an embodiment of the invention.
Figure 2:
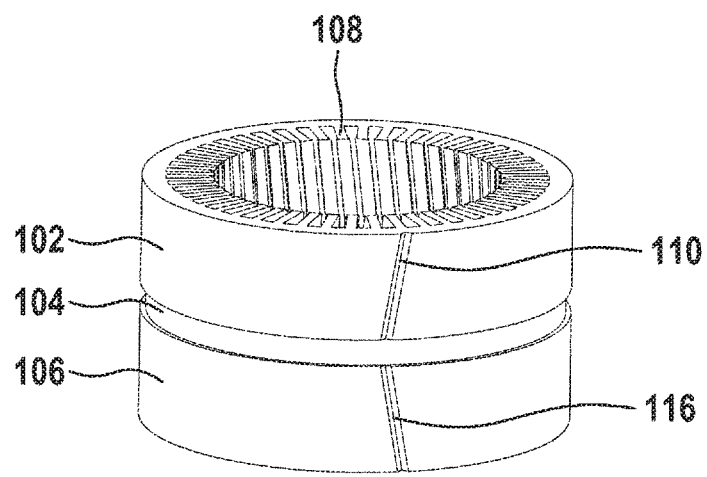
FIG. 2 is a schematic perspective view of the stator according to the embodiment of the invention.

Reference is made to FIGS. 1 and 2 which show an embodiment of the invention in a schematic fashion. An electric machine comprises a first stator element 102, a second stator element 106 and a third stator element 104. The three stator elements 102, 104, 106 are designed in an annular shape around respective center lines and are arranged directly next to one another in such a way that their center lines or their prolongations are congruent. The first stator element 102 has a plurality of teeth 108 which extend inward in the radial direction, and is arranged on the third stator element 104 having a plurality of radially inwardly extending teeth 112. A second stator element 106 has a plurality of teeth 114 which extend in the radially inward direction, and is arranged on the third stator element, on the side opposite the first stator element 102.

The first stator element 102 and the second stator element 106 are constructed from a ferromagnetic material, for example highly permeable, soft-magnetic types of steel, electric ribbon, electric sheet metal or the like. The electric ribbon can have a thickness of approximately 0.25 to approximately 0.5 mm.

Such materials are usually electrically conductive. On the first stator element 102, the teeth 108 are arranged obliquely with respect to the longitudinal axis of the stator 100 at a first angle 110. In the second stator element 106, the teeth 114 are arranged obliquely with respect to the longitudinal axis of the stator in a second direction 116. The first angle 110 and the second angle 116 are opposite one another, in particular the first and the second angles are symmetrical with respect to the third stator element 104. The first angle 110 and the second angle 116 are defined as follows: the teeth 108 and 114 each have a central plane which on each tooth runs centrally between the two outer faces which point toward the adjacent teeth. This central plane of each tooth 108, 114 intersects the central line of the respective first and second stator elements 102, 106. In this context, the first angle 110 is formed between the central plane of each tooth 108 and the central plane of the first stator element 102 (i.e. the first angle is less than 90°). The second angle 116 is formed between the central plane of each tooth 114 and the central plane of the second stator element 106 (i.e. the angle is less than 90°).

The third stator element 104 is manufactured from an electrically insulating material, for example plastic, insulation paper, aramid paper, laminates, ceramic or the like.

On the third stator element 104, the teeth 112 are oriented parallel to the longitudinal axis of the stator.

In the case of a two-part insulation, the invention has the advantage that insulation elements do not have to extend over the entire length of the stator 100.

Figure 3B:
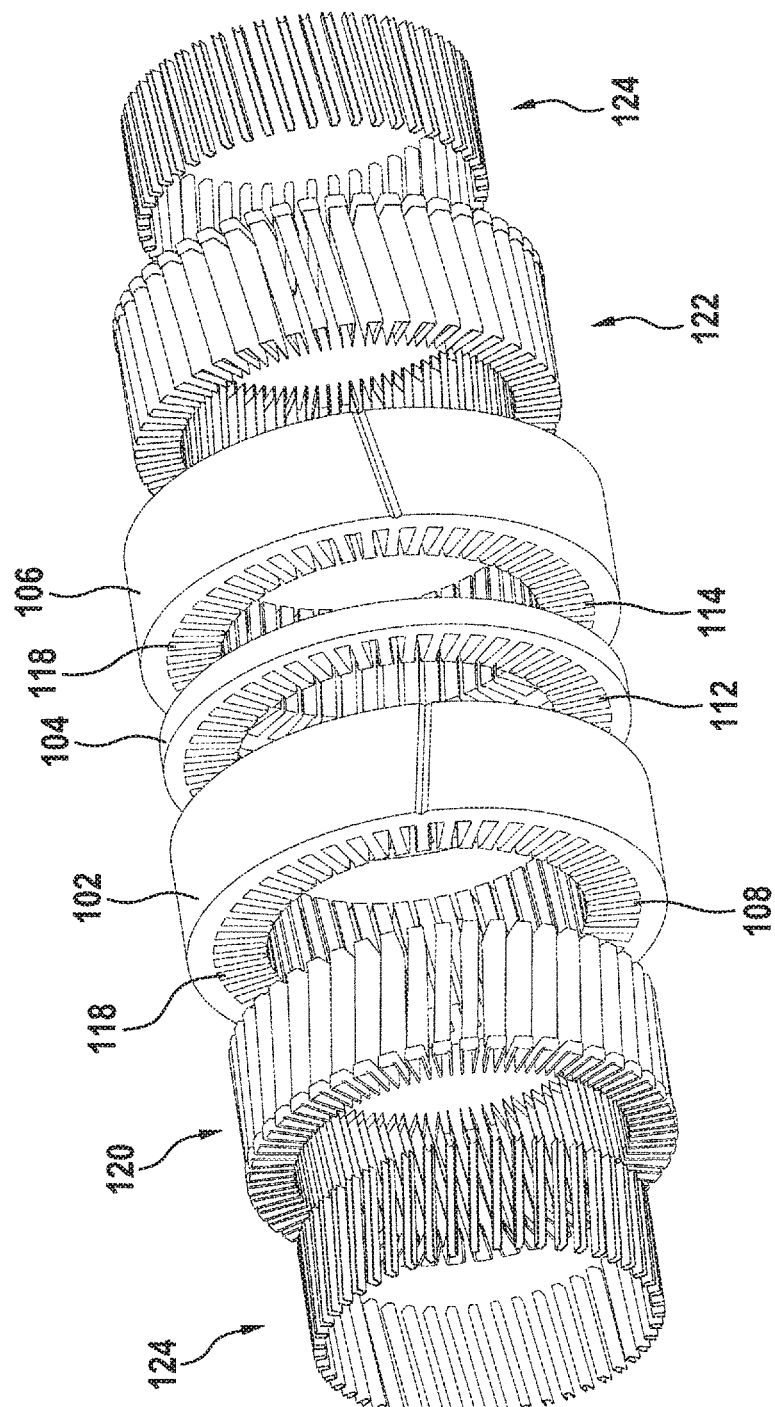
Figure 3C:
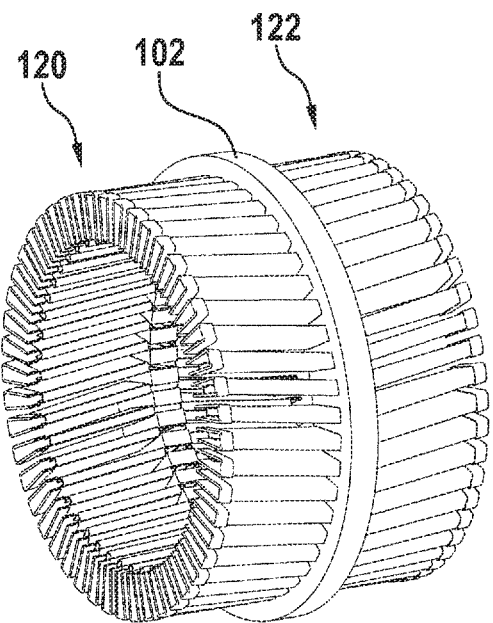
Figure 3D:
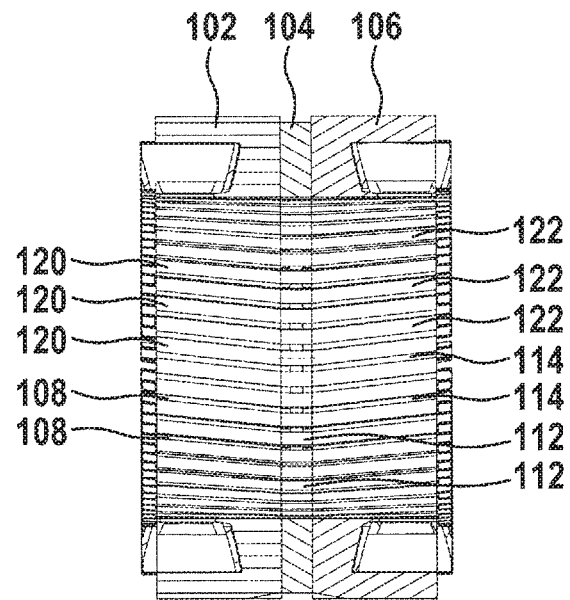

Reference is made to FIGS. 3A to 3D, FIG. 3A showing a plan view of a stator 100, FIG. 3B showing an exploded illustration of the stator 100, FIG. 3C showing insulation elements 118, 124 and the third region 104, and FIG. 3D showing a section along the line A-A in FIG. 3A. A groove 118 extends between two teeth 108 of the first stator element, two teeth 112 of the third stator element and two teeth 114 of the second stator element 106. Arranged in the groove 118 is a first insulation element 120 which extends over the first stator element 102 and a part of the third stator element 104 in the groove 118. A second insulation element 122 extends in the groove 118 over the second stator element 106 and a part of the third stator element 104. The first insulation element 120 and the second insulation element 122 can be made of an aramid fiber material or a laminate made of insulation materials. The thickness of the first and second insulation elements can be between 0.1 mm to 0.5 mm, preferably 0.25 mm to 0.4 mm. Sliding covers 124 can be arranged over the grooves 118 and the windings (not shown) in order to insulate the windings better.

Figure 4:
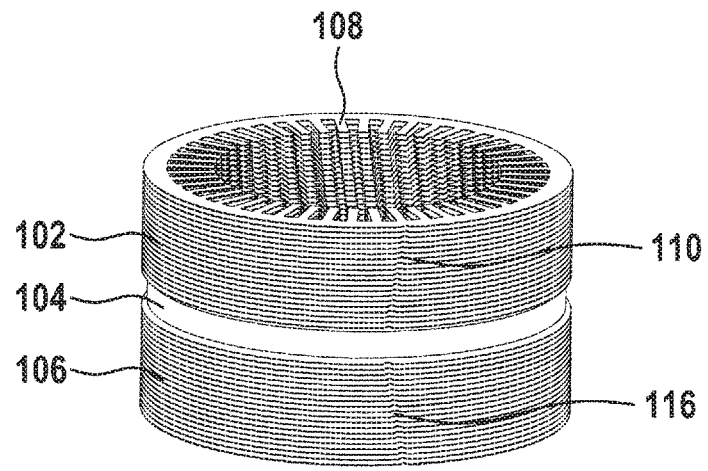
FIG. 4 shows the stator constructed from a plurality of laminated cores.

Reference is made to FIG. 4 which shows a stator with a plurality of laminated cores. The first stator element 102 has a plurality of pieces of sheet metal which are arranged on one another. The teeth 108 of the laminated core 102 run at a first angle 110 obliquely with respect to the longitudinal axis of the stator 100. The third stator element 104 is constructed, for example, from plastic throughout. The second stator element 106 is formed from a plurality of pieces of sheet metal which are arranged on one another. The teeth of the second stator element 106 run at a second angle 116 obliquely with respect to the longitudinal axis of the stator 100, wherein the second angle 116 is opposed to the first angle 110.

For reasons of clarity, the windings in the grooves 118 are not shown.

Figure 5:
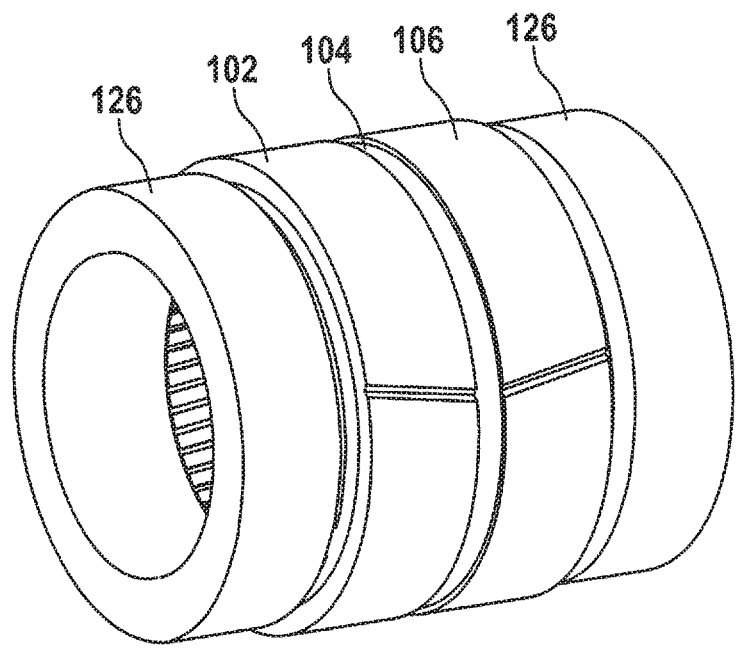
FIG. 5 shows the winding heads on the stator.

FIG. 5 shows the position of the winding heads 126 on the first region 102 and on the second region 106.

The stator according to the invention has the advantage that excitations of vibrations and therefore the emission of sound are reduced, and damage to insulation elements for the winding can be avoided.

While the invention has been illustrated and described in detail in the drawings and the preceding description, this illustration and description are to be understood as illustrative or exemplary and not as restrictive, and there is no intention to restrict the inventions to the disclosed exemplary embodiments. The mere fact that specific features are specified in various dependent claims is not intended to indicate that a combination of these features could not also advantageously be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A stator for an electric machine, comprising:
   a first region, a second region and a third region, each region modular from the others and extending in an axial direction of the stator;
   a plurality of teeth which are each configured such that a winding is arrangable thereon, the plurality of teeth including first teeth axially delineating the first region and second teeth axially delineating the second region;
   wherein the first teeth have a first angle with respect to a longitudinal axis extending in an axial direction of the stator,
   wherein the second teeth have a second angle with respect to the longitudinal axis, the second angle being different from the first angle, and
   wherein the teeth are electrically insulated in a third region which is arranged between the first region and the second region and which does not have teeth at the first angle or the second angle.

2. The stator as claimed in claim 1, wherein the second angle is opposite the first angle.

3. The stator as claimed in claim 2, wherein the plurality of teeth further includes third teeth axially delineating the third region, the third teeth being parallel to the longitudinal axis.

4. The stator as claimed in claim 1, wherein the first and second regions are formed at least 50% from a ferromagnetic material.

5. The stator as claimed in claim 1, wherein the first and second regions are formed at least 75% from a ferromagnetic material.

6. The stator as claimed in claim 1, wherein the first and second regions are formed at least 95% from a ferromagnetic material.

7. The stator as claimed in claim 1, wherein the first region and the second region have a laminated core.

8. The stator as claimed in claim 1, wherein the plurality of teeth further includes third teeth axially delineating the third region, the third teeth being parallel to the longitudinal axis.

9. The stator as claimed in claim 1, wherein
   the first region is formed by a first stator element,
   the second region is formed by a second stator element, and
   the third region is formed by a third stator element which is arranged between the first stator element and the second stator element and is formed from a material which is electrically nonconductive.

10. The stator as claimed in claim 1, wherein the third region comprises a plurality of elements whose angle is adjustable with respect to the longitudinal axis.

11. The stator as claimed in claim 1, wherein
    the first region is formed by a first stator element,
    the second region is formed by a second stator element, and
    the third region is formed by an insulation layer which extends radially inward on a part of the first region and a part of the second region.

12. An electric machine, comprising:
    the stator as claimed in claim 1;
    a plurality of windings which are arranged on the teeth of the stator;
    at least a first insulation element and at least a second insulation element;
    wherein the at least one first insulation element is arranged on the first region,
    the at least one second insulation element is arranged on the second region, and
    the windings are arranged on the at least one first and the at least one second insulation elements.

13. The electric machine as claimed in claim 12, wherein
    the at least one first insulation element is arranged on the first region and a part of the third region, and
    the at least one second insulation element is arranged on the second region and a part of the third region.

14. The electric machine as claimed in claim 12, wherein the first and second insulation elements are a single piece, the single piece being arranged on the first region, the third region and the second region, and having at least one flexible region on the third region and/or in surroundings of the third region.

* * * * *